United States Patent [19]
Fukuta et al.

[11] Patent Number: 4,938,270
[45] Date of Patent: Jul. 3, 1990

[54] SPHERICAL CLOTH WEAVING MACHINE WITH SHUTTLE CHUCKS

[75] Inventors: Kenji Fukuta, Ibaraki; Syozo Nakata, Amagasaki; Kunihiko Murayama, Amagasaki; Hiroshi Hatta, Amagasaki, all of Japan

[73] Assignee: Mitsubishi Denki Kabushiki Kaisha & Agency of Industrial Science and Technology, Tokyo, Japan

[21] Appl. No.: 196,429

[22] Filed: May 20, 1988

[30] Foreign Application Priority Data

Jun. 9, 1987 [JP] Japan ................................. 62-143780

[51] Int. Cl.$^5$ .............................................. D03D 37/00
[52] U.S. Cl. ..................................... 139/457; 139/459
[58] Field of Search .................... 139/14, 13 R, 444 R, 139/13 A, 16, 17, 11, DIG. 1, 48, 383 R, 457, 459; 87/8, 33

[56] References Cited
U.S. PATENT DOCUMENTS

| 3,709,262 | 1/1973 | Braunschweiler | 139/14 |
| 4,183,232 | 1/1980 | Banos et al. | 139/14 |
| 4,316,488 | 2/1982 | Manini et al. | 139/13 R |
| 4,492,096 | 1/1985 | Cahuzac | 139/14 |
| 4,694,866 | 9/1987 | Kuo-Ching et al. | 139/13 R |

FOREIGN PATENT DOCUMENTS 516243 2/1929 Fed. Rep. of Germany .

Primary Examiner—Andrew M. Falik
Attorney, Agent, or Firm—Oblon, Spivak, McClelland, Maier & Neustadt

[57] ABSTRACT

A spherical cloth weaving machine in which radially stretched warp yarn and circumferentially running weft yarns are woven into a desired spherical shape, the machine being constructed with a mechanism for moving the warp yarns alternately by shuttle chucks which hold required numbers of the warp yarns at their outer peripheral part. A mechanism is provided for hooking the circumferential weft yarn and beating the same toward the center of the warp yarns for compact weaving. A weft yarn rotating mechanism causes the weft yarn to pass through the warp yarns which are being moved by the warp yarn moving mechanism. A mechanism is provided for maintaining the woven cloth in a spherical shape.

3 Claims, 5 Drawing Sheets

SPHERICAL CLOTH WEAVING MACHINE WITH SHUTTLE CHUCKS

BACKGROUND OF THE INVENTION

FIELD OF THE INVENTION

The present invention is concerned with a spherical cloth weaving machine suitable for weaving spherically shaped woven fabrics which constitute the core material for fabrication of a parabolic mirror to be used as a space communication antenna, a infrared ray telescope, the solar ray collecting system, and so forth.

DISCUSSION OF BACKGROUND

The spherically shaped woven fabrics as shown in FIG. 4 have conventionally been manufactured by cutting plain woven cloth in a circular form, laminating several sheets of the thus cut cloth, and shaping the lamination into a predetermined spherical shape. Since however, the plain woven cloth is in such a woven or weaving configuration as shown in FIG. 5 of the accompanying drawing, when it is shaped in a spherical form, there takes place elongation at its circular center part or slackening at the periphery thereof with simultaneous reduction in strength of the woven circular fabric in its circumferential direction other than the direction of fiber. As a consequence of this, the spherical or parabolic reflecting mirror manufactured from the plain woven cloth having such state of weaving is liable to be deformed in use, due to climate and temperature change, which has been the cause for deteriorating performance of the surface of the reflecting mirror.

At the time of its manufacture, such a conventional parabolic antenna or reflecting mirror is stretched at the center part and stretched at the peripheral part due to inhomogeneity of its structure in the circumferential direction and its shaping into a spherical shape, hence non-uniformity in strength and stress distribution of the spherical body as shaped; for example, there tends to easily occur deformation on the spherical surface to be used as the parabolic reflecting mirror, which renders it insufficient in performance as the reflecting surface and poor in its operating reliability.

SUMMARY OF THE INVENTION

The present invention has been made with a view to solving various problems as mentioned in the foregoing, and aims at providing a spherical cloth weaving machine for manufacturing woven fabrics in a cubic shape having a spherical surface. With this spherical cloth weaving machine, there can be obtained homogeneously woven fabric, in which the warp yarns are arranged in the radial direction and the weft yarns are arranged in the circumferential direction to run around the pivotal center of the radially arranged warp yarns, and, at the same time, there can be directly formed the woven fabric in the cubic shape by use of, for example, a spherical jig in the course of the weaving operations. On account of this, there is no fear of causing deformation of the woven fabric during its processing as the mirror surface of the parabolic reflecting mirror, for example, and during use of such parabolic reflecting mirror.

According to the present invention, in general aspect, there is provided a spherical cloth weaving machine which comprises in combination: means for moving warp yarns alternately by shuttle chucks which hold required numbers of the warp yarns at the outer peripheral part and shift at the end part of the warp yarns to the side of the circumference; means for hooking circumferential weft yarns and beating the same toward the center; weft yarn rotating means to cause the weft yarn to pass through the warp yarns; and means for maintaining the cloth as woven in the spherical shape.

The foregoing object, other objects as well as specific construction and function of the spherical cloth weaving machine according to the present invention will become more apparent and understandable from the following detailed description thereof, when read in conjunction with the accompanying drawing illustrating a particular embodiment of the present invention.

DETAILED DESCRIPTION OF THE PREFERRED EMBODIMENTS

Figure 1:
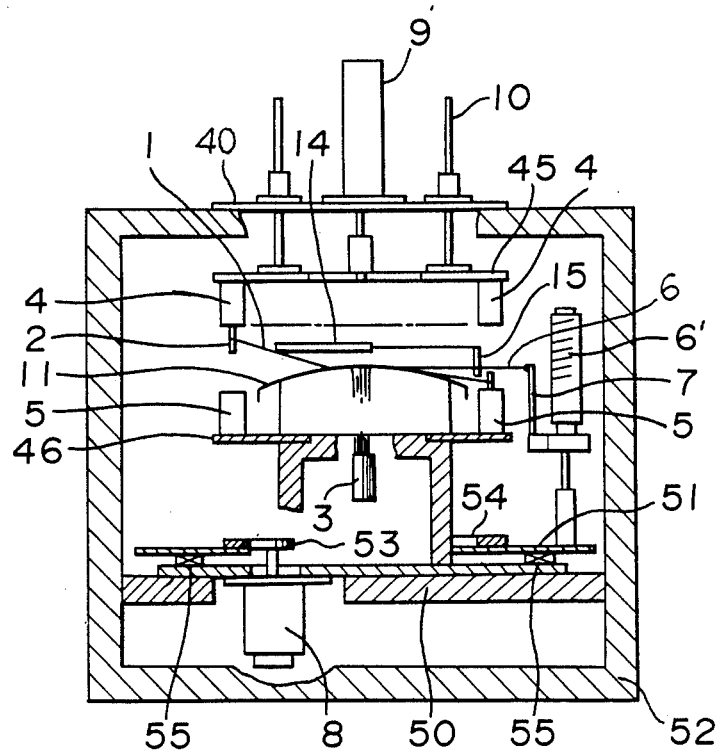
FIG. 1 is a front view, partly in cross-section, showing the spherical cloth weaving machine according to one preferred embodiment of the present invention.

In order to obtain the spherically woven fabric, the spherical cloth weaving machine according to the present invention has upper and lower chucks functioning to alternately hold required numbers of radially stretched warp yarns at their outer peripheral part, by the alternate holding of which the weft yarn in the circumferential direction passes through the warp yarns by its rotation to thereby weave the yarns into a textile structure in the spherical shape.

In the following, one preferred embodiment of the present invention will be described in reference to the drawing.

Referring first to FIG. 1 which is a front view, partly in cross-section, of the spherical cloth weaving machine according to one embodiment of the present invention, a reference numeral 4 designates a plurality of upper chucks 4 which are fixed on an upper chuck mounting plate 45 at equal circumferential positions, each chuck holding alternatively a shuttle 2 for warp yarn; a numeral 5 refers to a plurality of lower chucks which are fixed on a lower chuck mounting plate 46 which is, in turn, fixed on a base 50. At positions corresponding to the upper chucks 4, each chuck holding alternatively a shuttle 2 for the warp yarn, as is the case with the upper chuck 4, with the consequence that, in the course of weaving, the warp yarn shuttle 2 becomes alternately held on the upper chuck 4 and the lower chuck 5; a numeral 6 refers to a circumferential weft yarn which is wound on a yarn bobbin 6', the bobbin being inserted into a shaft in a freely rotatable manner and the shaft being fixed onto an annular turn-table 51; a reference numeral 7 denotes a stretching mechanism for the circumferential weft yarn, which is fixed onto the turntable 51 through a shaft so as to impart a predetermined tensile force to the circumferential weft yarn 6; a reference numeral 8 represents an electric motor which is fixed by screws to the base 50 which is, in turn, fixed onto a frame 52.

This motor 8 has at one end of its rotational shaft a gear 53 which is meshed with an annular gear 54 on the turn-table, having inner peripheral teeth. The gear 54 is fixed on the turn-table 51, which is mounted on the base 50 through a bearing 55 so as to be rotatable with respect to the base 50. As the consequence of this, when the motor 8 starts to rotate, its rotation is transmitted to the motor-side gear 53 and the turn-table side gear 54, whereby the turn-table 51 rotates to cause the circumferential weft yarn 6 mounted on this turn-table 51 to rotate, too.

A reference numeral 9 indicates a cylinder provided on the frame 52 via a plate 40. One the moving shaft of this cylinder is fixed on the upper chuck mounting plate 45. As a result of the up-and-down movement of this moving shaft of the cylinder 9, the upper chuck mounting plate 45 is guided by a guide member 10 and moves vertically, whereby the upper chuck also moves vertically. A reference numeral 11 designates a spherical jig fixed on the base 50 in a freely attachable and detachable manner The surface of the spherical jig 11 may assume, in some cases, a perfect spherical shape, a parabolic curved surface, and an assymmetric curved surface, in order to obtain an intended spherical surface In the ensuing description, these curved surfaces will be generally referred to simply as "spherical surface".

Hereinbelow, explanations will be given as to a mechanism which constitutes the main part of the preferred embodiment of this invention.

Figure 2:
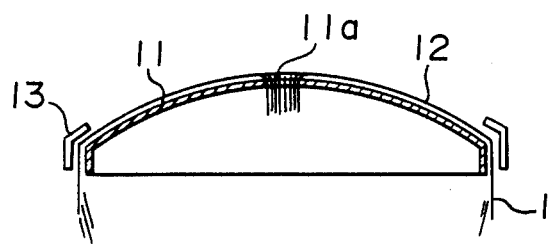
FIG. 2 is a cross-sectional view for explanation of a state of maintaining the spherically woven fabric made by use of the spherical cloth weaving machine as shown in FIG. 1.

In FIG. 1, a reference numeral 1 denotes the radial warp yarns One end of each of the yarns is fixedly connected to a stretching weight 3, and the yarns pass through a hole 11a of the spherical jig 11 as means for arranging the warp yarns in a radially stretched state, as shown in FIG. 2 while the other end thereof is connected to a plurality of shuttles 2 for the radial warp yarns disposed on the outer peripheral part of the warp yarns. The radial warp yarns 1 are arranged on the circumference in required numbers, and are held in the upper chucks 4 and the lower chucks 5 which are distributed proportionally depending on the intended textile structure, through the shuttle 2 for the radial warp yarns. The circumferential weft yarn 6 is driven by the motor 8 in and around an open space between the upper chucks 4 and the lower chucks 5, thereby weaving the intended spherical cloth The stretching mechanism 7 for the circumferential weft yarn 6 inserts this weft yarn between the radial warp yarns, and adjusts compactness of the cloth as woven. Further, a beating mechanism 14 functions to hook the circumferential weft yarn 6 on its pawl 15 at every rotating of the weft, and then performs beating of the weft yarn toward the center of the woven fabric.

Figure 3:
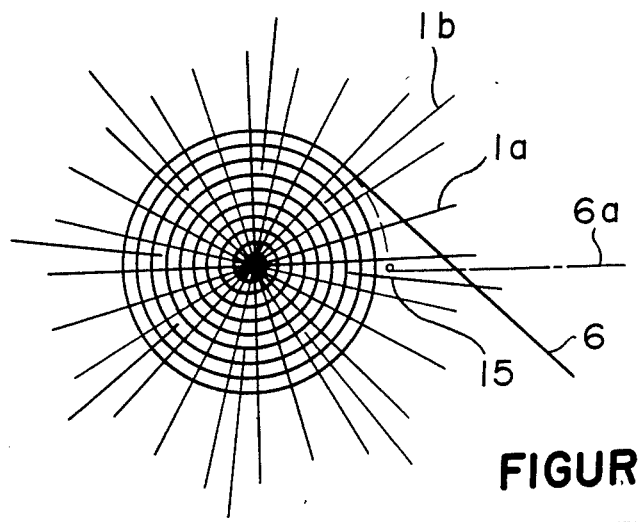
FIG. 3 is a schematic diagram showing a manner of weaving the spherical cloth by the weaving machine according to one preferred embodiment of the present invention.

FIG. 3 is a schematic diagram showing the manner of weaving the spherical cloth in accordance with the present invention. This figure illustrates a case, in which the circumferential weft yarn 6a is being beaten by the pawl 15 of the beating mechanism 14, the circumferential weft yarn 6 moving in the circumferential direction during rotation of the motor 8, the radial warp yarns 1a extending from the center and the radial warp yarns 1b being interposed between radial warp yarns 1a, but not extending to the center.

The cylinder 9 shown in FIG. 1 is for moving the upper chucks 4 up and down, which is so constructed that, during the beating operation by the pawl 15, it performs exchange for alternate holding of the radial warp yarns 2 between the upper and lower chucks The spherical jig 11 has a hole 11a at its center part, through which one end of the radial warp yarn 1 is connected to the stretching (or tension-applying) weight 3. The positions of the lower chucks 5 and the stretching mechanism 7 for the circumferential weft yarn are progressively brought to a lower position where the woven portion of the cloth is urged to the curved surface of the spherical jig, i.e., to the direction of the top surface of the spherical jig 11 (as shown at the center position in FIG. 1). At the same time, by the pawl 15 of the beating mechanism 14 moving to the center from the outer periphery along the surface of the spherical jig 11 and pressing the woven cloth under a constant pressure, the woven fabric can be formed in a predetermined cubic shape in conformity to the curved surface of the spherical jig 11.

Figure 6:
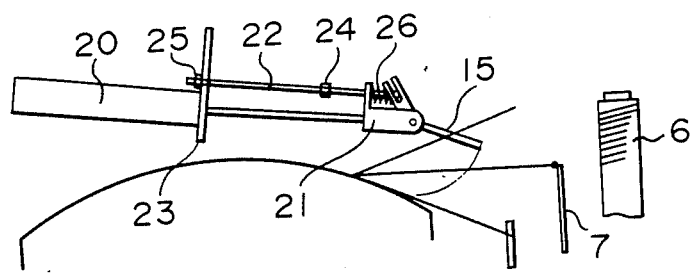
FIG. 6 is a diagram showing a preferred embodiment of a beating machanism in a free state, used for the weaving machine of the present invention.
Figure 7:
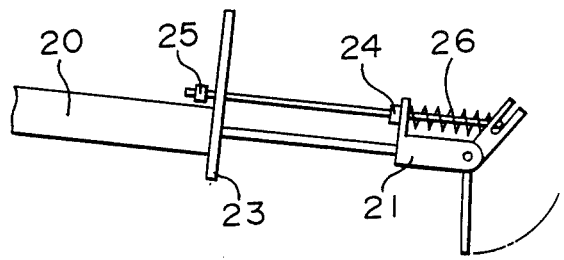
FIG. 7 is a diagram showing the beating machanism in operation.

FIGS. 6 and 7 show in more detail the operation of the beating mechanism 14. In FIG. 6, when the circumferential weft yarn is driven for rotation, the circumferential weft yarn 6 and the stretching mechanism 7 for the circumferential weft yarn are stopped at the position where the stretching mechanism 7 just passes below the pawl 15 at every rotation or at alternate rotations of the weft yarn. When the weft yarn 6 and stretching mechanism 7 are stopped, a pneumatic cylinder 20 is operated to pull a bearing piece 21 attached to the end of the operating rod of the cylinder 20. One end of a driving shaft 22 is fixed to a supporting plate 23 which is, in turn, fixed to the cylinder 20, and the other end of the driving shaft pivotally supports by means of pin-fitting a part of the pawl 15. A stopper 24 is fixed to the driving shaft 22 so that it assures the position of the pawl 15 to be fixed when the pawl 15 is rotated by the action of a spring 26. Another stopper 25 is provided such that in the pushing operation of the cylinder 20, it compresses the spring 26 to locate the pawl 15 horizontally so as not to constitute an obstacle when the weft yarn 6 is passed.

FIG. 7 shows a state of the pneumatic cylinder 20 which is driven with some amount of compression. At this moment, the weft yarn 6 is hooked by the pawl 15 to be urged toward the center the circle to urge the weft yarn 6a with a predetermined force (FIG. 3).

In weaving fabrics, generally, beating of the weft yarn is carried out by pressing the entire surface of the woven yarns to make woven fabrics to be compact. However, when spherically shaped woven fabrics are to be manufactured, it is necessary to apply a stretching force in the direction tangent to the circumference of the spherically shaped woven fabrics while it is pressed at one point whereby the entire woven fabric can be compact. In this case, there takes place a state that the circumferential weft yarn 6 does not intersect with the radial woven yarn 1. Accordingly, under the condition that the cylinder 20 is retracted to pull the circumferential weft yarn 6 (in a state as indicated by a one dotted chain line in FIG. 3), the cylinder 9 is lowered to perform exchange of alternate holding of the radial warp yarns 2 between the upper and lower chucks 4, 5. After finishing the exchange of alternate holding, the bearing piece 21 is extended by the cylinder 20 to be returned to the condition as in FIG. 6. Then, the circumferential weft yarn 6 is started in its rotation again. Thus, the above-mentioned operations, i.e. the stop of rotation of the weft yarn 6, the driving of the beating mechanism 14, the alternate holding of the shuttle 2 for the radial warp yarn, the returning of the beating mechanism 14, and the rotation of the circumferential weft yarn 6, are repeated.

Figure 8:
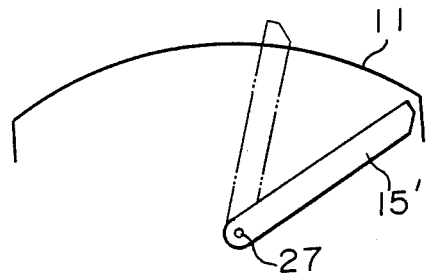
FIG. 8 is a diagram showing another preferred embodiment of the beating mechanism.

FIG. 8 is diagram showing another embodiment of the beating mechanism of the present invention. In FIG. 8 a pawl 15' is provided inside the spherical jig 11, and one end of the pawl 15' is pivoted by a shaft 27. In this embodiment, the beating operation is carried out by turning the pawl 15 by using a pneumatic cylinder around the pivoting shaft 27.

Figure 9:
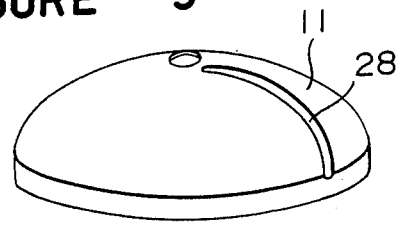
FIG. 9 is a perspective view of an embodiment of the spherical jig used for the present invention.

FIG. 9 is a perspective view of an embodiment of the spherical jig 11 having a groove 28 in its spherical surface in the radial derection so as to receive the pawl 15 therein.

Figure 10:
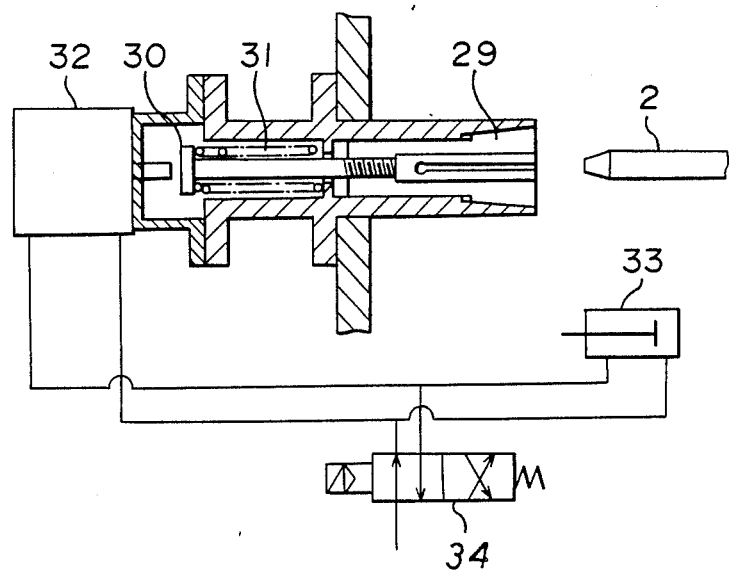
FIG. 10 is a diagram showing an embodiment of the chuck mechanism used for the weaving machine of the present invention.

FIG. 10 is a diagram showing an embodiment of the chucks 4, 5 in more detail A collect chuck 29 is so made as to close its holding part by a shaft 30 which is screwfitted to one end of the collect chuck 29 and a compression spring 31. A pneumatic cylinder 32 pushes the shaft 30 i.e. the collect chuck 29 by the action of compressed air to open the holding part of the collect chuck to thereby allow insertion of the shuttle 2 for the radial warp yarn. Another cylinder 33 is provided to face the holding part of the collect chuck 29. The cylinders 32, 33 perform alternate closing and opening operations by means of an electromagnetic valve 34.

Figure 11:
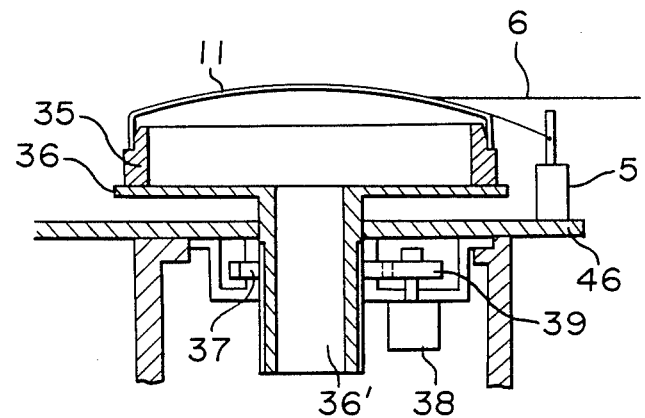
FIG. 11 is a diagram of an embodiment of the spherical jig mounting and moving mechanism of the present invention.

FIG. 11 is a diagram showing an embodiment of a mounting and moving mechanism for the spherical jig 11. A base plate 35 has a fitting part on its upper portion with which the inner part of the spherical jig 11 is engageable. The base plate 35 is fixed to a vertically movable plate 36 which is provided with a hollow shaft 36' at its central part. The outer periphery of the hollow shaft 36 has a threaded portion with which a gear 37 is engaged On the other hand, a small gear 39 attached to the shaft of a motor 38 is meshed with the gear 37. By driving the motor 38 in either direction, the vertically movable plate 36 is upwardly or downwardly moved by means of the threaded portion formed in the hollow shaft 36' and the gears 37, 39. An anti-rotation means (not shown) is provided between the vertically movable plate 36 and the lower chuck mounting plate 46 so as to allow a vertical-sliding movement for the vertically movable plate 36.

Figure 12:
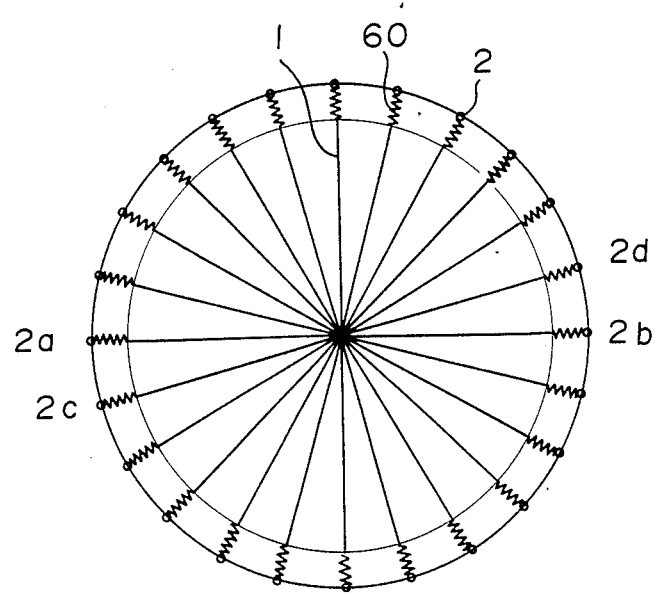
FIG. 12 is a diagram illustrating one example of stretching of the radial warp yarns.

FIG. 12 is a diagram showing another embodiment of the arrangement of the radial warp yarns 1. In an even number of shuttles for the radial warp yarns 2, elastic members 60 such as springs, rubber and so on are interposed between each of the radial warp yarns 1 and each opposing sets of the shuttles 2a–2b, 2c–2d, ... The elastic members 60 impart a tension to each of the radial warp yarns and give to the warp yarns flexibility in its longitudinal direction.

Referring to FIG. 3, an example of adding the radial warp yarns 1b during weaving operations will be described. The radial warp yarns 1 are connected to the shuttles 2 for the radial warp yarns at the initial stage as shown in FIG. 12 The shuttles 2 are attached to the upper and lower chucks 4, 5. When the central part of the fabrics are to be woven, some shuttles 2 for the radial warp yarns 2 are held by the upper chucks 4 which remain stationary. Then, when the density of the radial warp yarns 1 becomes insufficient and the addition of the warp yarns is needed, the upper chucks 4 undergo the alternate up-and-down movements, whereby the radial warp yarns 1b are added. Alternatively, the radial warp yarns 1b may be connected to the circumferential weft yarn which is already woven in a spherical form, the other ends of the radial warp yarns being connected to the upper and lower chucks 4, 5. In the case, stretching weights used in FIG. 1 embodiment are unnecessary.

FIG. 2 is a cross-sectional diagram showing the maintenance of the spherical woven cloth 12 as obtained by the spherical cloth weaving machine as shown in FIG. 1. The shuttle 2 for the radial warp yarn is removed, then the periphery of the spherical woven fabric 12 is fixed with a presser ring 13, and the stretching weight 3 is removed In this state, transportation, storage and shaping treatment with thermosetting resin, etc. of the spherical woven fabric are effected together with the spherical jig 11, whereby the precision in the spherical shape of the woven cloth can be secured.

Figure 4:
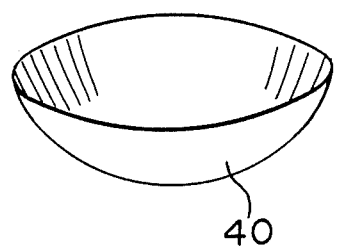
FIG. 4 is a perspective view showing the spherically woven fabric as finished and having the required shape.
Figure 5:
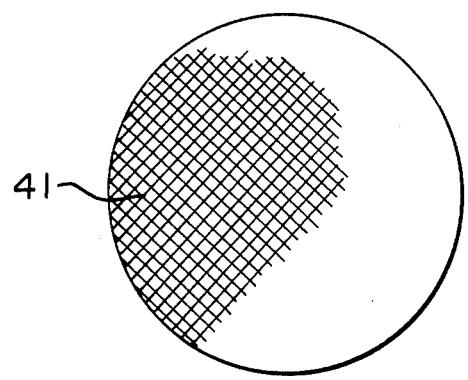
FIG. 5 is an explanatory diagram showing the arrangement of yarns of the conventional plain woven cloth.

Thus, in the preferred embodiment of the present invention, the spherical cloth is woven by the weaving method as shown in FIG. 3, then the woven cloth is shaped in conformity to the surface of the spherical jig 11 as shown in FIG. 2, and thereafter it is subjected to the shaping treatment with thermosetting resin, etc. to be the finished product as shown in FIG. 4.

In the above-described embodiment of the present invention, the upper chucks 4 are illustrated in connection with the up-and-down mechanism by means of the cylinder 9. It may also be possible that the upper chucks 4 be gradually raised or lowered by use of a cam, etc. which transmits power from a driving mechanism such as the motor 8. Further, the alternate up-and-down movement of the upper chucks 4 is not limited to this embodiment alone, but any other expedients that cause the circumferential weft yarn to pass through the warp by the alternate relative movement of the shuttle for the radial warp yarns may be used.

Furthermore, in the foregoing explanations, the spherical jig 11 used is the same during the weaving step of the spherically woven fabric 11 and during transportation and storage as well as shaping treatment with the thermosetting resin, etc. after the weaving. However, depending on the quality of the yarn to be used, the shape of the spherically woven fabric 11, or others, there may be possibility of the precision in the spherical shape of the woven fabric being substantially secured, even when the spherical jig 11 is changed from one to the other at the time of shifting to the subsequent step, hence the invention is not limited to this embodiment alone. Also, in the foregoing description, the spherical jig 11 has been explained as having the hole 11a at the center thereof, but it should be noted that this hole is not always necessary, but it is also possible to extend the radial warp yarn in the diametral direction to pass through the center of the circle, while weaving the spherical cloth with care being taken on the overlapping of the warp yarn at the center part.

As described so far, according to the present invention, the woven fabric is directly made into a spherical shape, and this woven fabric is held on one and same spherical jig or on the spherical surface of a jig having substantially same spherical shape as that of the previous one. On account of this, there can be obtained spherically woven fabric for the parabolic mirror, etc. of homogeneous structure throughout with high precision and free from any unnatural stress.

In the foregoing, the present invention has been described with reference to a preferred embodiment thereof. It should, however, be noted that the present invention is not restricted to this embodiment alone, but any modification and change may be made by those persons skilled in the art within the ambit of the invention as recited in the appended claims.

What is claimed is:

1. A spherical cloth weaving machine, wherein radially stretched warp yarns and circumferentially running weft yarn are woven into a predetermined configuration, said machine comprising in combination:
   means for arranging warp yarns in a radially stretched state;
   means for moving said warp yarns alternately by circumferentially spaced shuttle chucks which hold numbers of the warp yarns at a radially outer peripheral part of said warp yarns;
   means for hooking the circumferentially running weft yarns and beating the same toward a center of said radially stretched warp yarns for compact weaving;
   weft yarn rotating means for causing said weft yarn to pass through the warp yarns which have been moved by said warp yarn moving means; and
   means for maintaining the woven cloth in a spherical shape,
   wherein said means for maintaining comprise a spherical jig disposed in the weaving region of the warp yarns and the weft yarn and supporting said warp yarns, wherein said warp yarns and said weft yarns are woven while in close contact with and along the surface of the spherical jig, and
   wherein said means for arranging said warp yarns in a radially stretched state comprise a central hole in said jig and a weight to which radially inner ends of said warp yarns are attached, said warp yarns passing through said central hole at a position along their lengths between said weight and said shuttle chucks.

2. A spherical cloth weaving machine according to claim 1, wherein said spherical jig is freely attachable and detachable from the main body of the machine to enable the finished spherical woven fabric to be transported, stored, or subjected to a shaping treatment by hardening with the woven product being held on said spherical jig.

3. A spherical cloth weaving machine, wherein radially stretched warp yarns and circumferentially running weft yarn are woven into a predetermined configuration, said machine comprising in combination:
   means for arranging warp yarns in a radially stretched state;
   means for moving said warp yarns alternately by circumferentially spaced shuttle chucks which hold numbers of the warp yarns at a radially outer peripheral part of said warp yarns;
   means for hooking the circumferentially running weft yarns and beating the same toward a center of said radially stretched warp yarns for compact weaving;
   weft yarn rotating means for causing said weft yarn to pass through the warp yarns which have been moved by said warp yarn moving means; and
   means for maintaining the woven cloth in a spherical shape,
   wherein said means for maintaining comprise a spherical jib disposed in the weaving region of the warp yarns and the weft yarn and supporting said warp yarns, wherein said warp yarns and said weft yarns are woven while in close contact with and along the surface of the spherical jig, and
   wherein said spherical jib is freely attachable to and detachable from the main body of the machine to enable the finished spherical woven fabric to be transported, stored, or subjected to a shaping treatment by hardening with the woven product being held on said spherical jig.

* * * * *